United States Patent
Dorenbosch et al.

(10) Patent No.: US 6,314,301 B1
(45) Date of Patent: Nov. 6, 2001

(54) METHOD AND APPARATUS FOR ASSIGNING A MOBILE STATION TO A COMMUNICATION RESOURCE

(75) Inventors: Jheroen Pieter Dorenbosch, Paradise; Janus P. Burks, Richland Hills, both of TX (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/517,193

(22) Filed: Mar. 2, 2000

(51) Int. Cl.[7] .................................................. H04B 7/00
(52) U.S. Cl. ........................... 455/519; 455/518; 455/450
(58) Field of Search ................................ 455/518, 519, 455/450, 452, 509, 453, 464, 515, 166.2; 370/340, 341, 329

(56) References Cited

U.S. PATENT DOCUMENTS

| | | | |
|---|---|---|---|
| 5,117,501 | * | 5/1992 | Childress et al. ............... 455/519 |
| 5,128,938 | * | 7/1992 | Borras ............................ 455/343 |
| 5,369,783 | * | 11/1994 | Childress et al. ............... 455/509 |
| 5,796,722 | * | 8/1998 | Kotzin et al. .................. 455/453 |
| 5,852,781 | * | 12/1998 | Ahvenainen ................... 455/519 |
| 5,933,780 | * | 8/1999 | Connor et al. ................. 455/519 |
| 5,953,671 | * | 9/1999 | Childress ....................... 455/519 |
| 6,005,848 | * | 12/1999 | Grube et al. ................... 370/266 |
| 6,097,942 | * | 8/2000 | Laiho ............................. 455/414 |
| 6,097,963 | * | 8/2000 | Boltz et al. .................... 455/418 |

* cited by examiner

*Primary Examiner*—Dwayne Bost
*Assistant Examiner*—Sonny Trinh
(74) *Attorney, Agent, or Firm*—Robert L Breeden; Charles W. Bethards; Jeffrey K. Jacobs

(57) ABSTRACT

In a wireless communication system (100) affinity groups to which a mobile station (114) belongs are identified (504). Historical affinity strengths between the mobile station and the affinity groups are then determined (506). For each of a plurality of communication resources (102) serving members of the affinity groups, a total affinity strength between the mobile station and the members served by the communication resource is calculated (508). The mobile station is then assigned (522) to the communication resource having a highest total affinity strength with the mobile station.

14 Claims, 3 Drawing Sheets

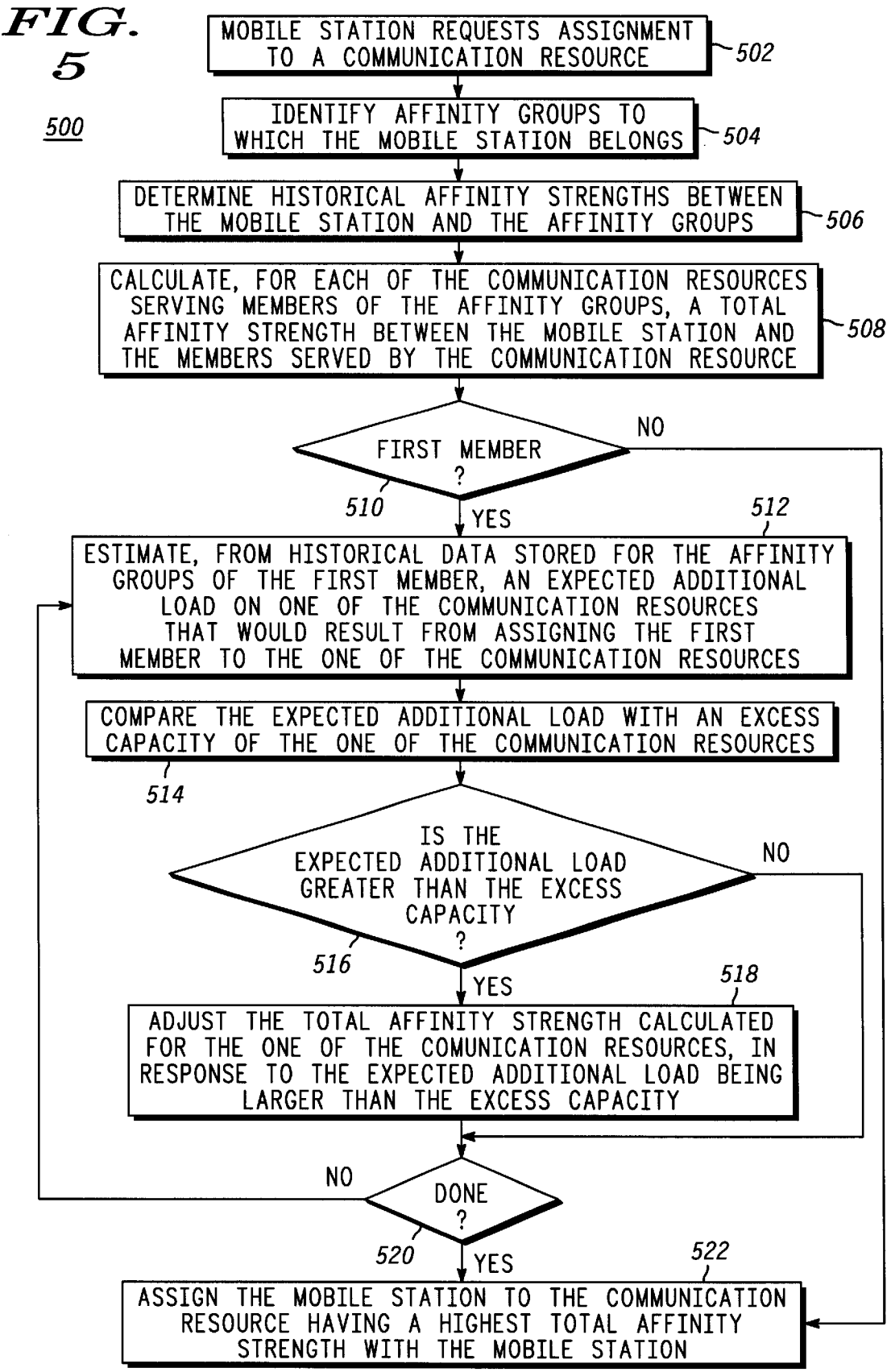

METHOD AND APPARATUS FOR ASSIGNING A MOBILE STATION TO A COMMUNICATION RESOURCE

FIELD OF THE INVENTION

This invention relates in general to wireless communication systems, and more specifically to a method and apparatus for assigning a mobile station to a communication resource.

BACKGROUND OF THE INVENTION

In mobile telephone systems the use of affinity groups is becoming popular. In Motorola's iDEN system, for example, mobile users are associated with affinity groups (called fleets). Within each fleet, a user can be a member of one or more groups. The iDEN system allows for very efficient group calls, where all members share the same communication resource, such as a Dispatch Application Processor (DAP) and voice Packet Duplicator (PD). When group members are in the same cell, they even share the same channel. Much of the group call efficiency is obtained by assigning all new members of a fleet to the DAP that already contains other fleet members. That way all fleet members will be controlled by the same DAP.

When the first member of a fleet roams into an urban system, no DAP has yet been assigned to the fleet, and one must be selected. Prior art systems have assigned the fleet to the DAP which has the lightest load at the time of the assignment. While this assignment method generally has worked well for small fleets, it can potentially cause problems when very large fleets exist on a system. Furthermore, users increasingly want to form affinity groups which cross fleet boundaries. For example, a taxi driver may want to be a member of one or more taxi groups, as well as his family group, his church group, and a local crime watch group.

Thus, what is needed is a method and apparatus for assigning a mobile station to a communication resource of a plurality of communication resources. The method and apparatus preferably will take into account the excess capacity of the communication resource and the potential load that can result from the assignment, and will select the communication resource based upon a total affinity strength between the mobile station and the communication resource.

BRIEF DESCRIPTION OF THE DRAWINGS

FIG. 5 is a flow diagram depicting operation of the wireless communication system in accordance with the present invention.

DETAILED DESCRIPTION OF THE DRAWINGS

Figure 1:
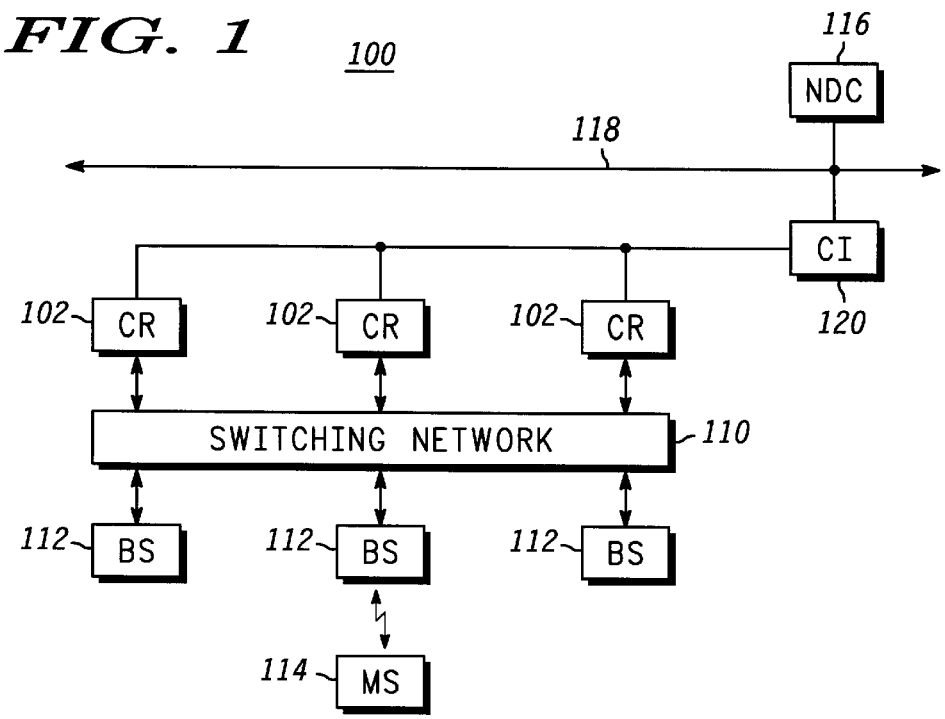
FIG. 1 is an electrical block diagram of an exemplary wireless communication system in accordance with the present invention.

Referring to FIG. 1, an electrical block diagram depicts an exemplary wireless communication system 100 in accordance with the present invention, comprising a mobile station 114, which communicates with a plurality of base stations 112 through conventional wireless techniques. The system 100 further comprises a conventional switching network 110 coupled to the base stations 112 for coupling ones of the base stations 112 to selected ones of a plurality of communication resources 102 in accordance with the present invention. The communication resources 102 are coupled to a conventional communication interface 120, which is coupled to a network database controller 116. The network database controller 116 and the communication resources 102 also are preferably coupled to a wide area network (WAN) 118 for sharing data with other wired and/or wireless communication systems utilized by the mobile station 114. The plurality of communication resources 102, the network database controller 116, the switching network 110, the base stations 112, and the mobile station 114 are arranged to cooperate with one another to perform in accordance with the present invention, as is described further below.

Figure 2:
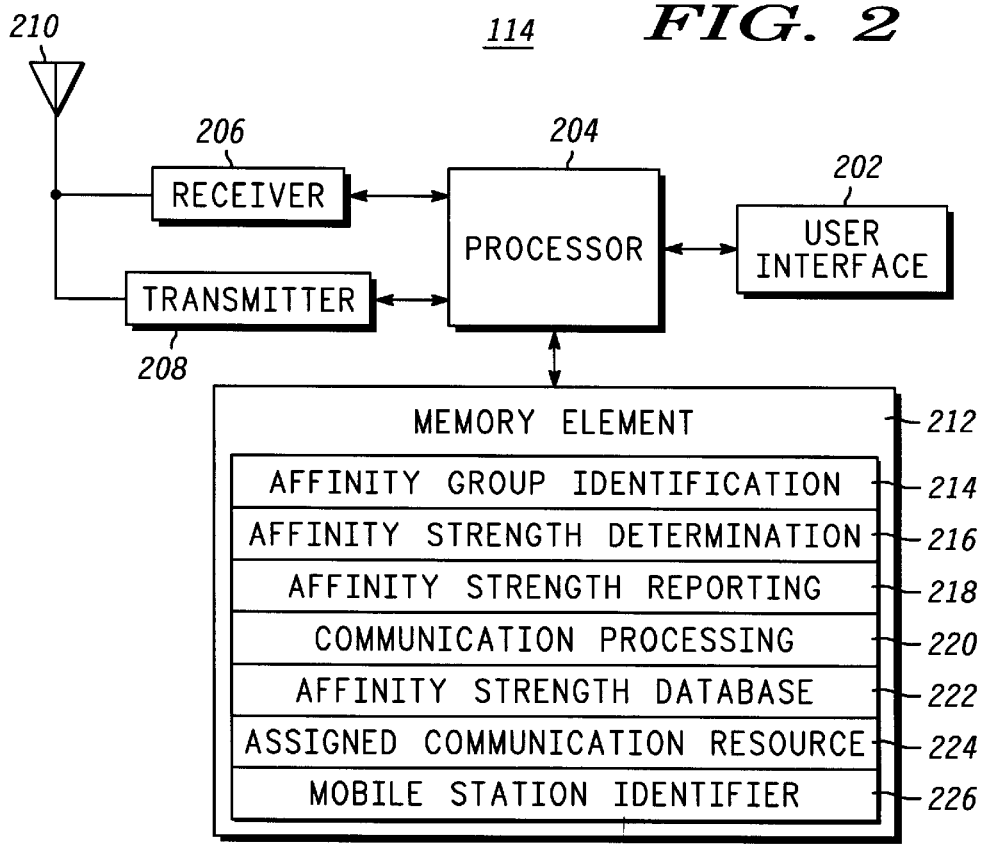
FIG. 2 is an electrical block diagram of an exemplary mobile station in accordance with the present invention.

Referring to FIG. 2, an electrical block diagram depicts an exemplary mobile station 114 in accordance with the present invention, comprising a conventional transmitter 208 for sending information to a fixed portion of the wireless communication system 100, and a conventional processor 204 coupled to the transmitter 208 for controlling the transmitter 208. The mobile station 114 further comprises a conventional receiver 206 coupled to the processor 204 for receiving messages from the fixed portion of the wireless communication system, and a conventional memory element 212 coupled to the processor 204 for storing software and historical data about the mobile station 114. The mobile station 114 also includes a conventional user interface, e.g., a handset, coupled to the processor 204 for interfacing with a user. An antenna 210 preferably is coupled to the receiver 206 and the transmitter 208 for intercepting and radiating a radio signal. It will be appreciated that, alternatively, wireless communication techniques other than radio can be utilized as well.

The memory element 212 preferably comprises an affinity group identification program 214 for programming the processor 204 to identify affinity groups to which the mobile station 114 belongs. The memory element 212 preferably further comprises an affinity strength determination program 216 for programming the processor 204 to determine and store historical affinity strengths between the mobile station 114 and the affinity groups. The memory element 212 preferably further includes an affinity strength reporting program 218 for programming the processor 204 to report selected ones of the historical affinity strengths to the fixed portion of the wireless communication system 100 when requesting an assignment to one of the communication resources 102. In addition, the memory element 212 includes a communication processing program 220 for programming the processor 204 to control the receiver 206 and the transmitter 208 to communicate with the fixed portion of the wireless communication system 100 through well-known techniques. The memory element 212 also includes space for storing an affinity strength database 222, an identifier of an assigned communication resource 224, and a mobile station identifier 226. Operation of the mobile station 114 in accordance with the present invention is described further below.

Figure 3:
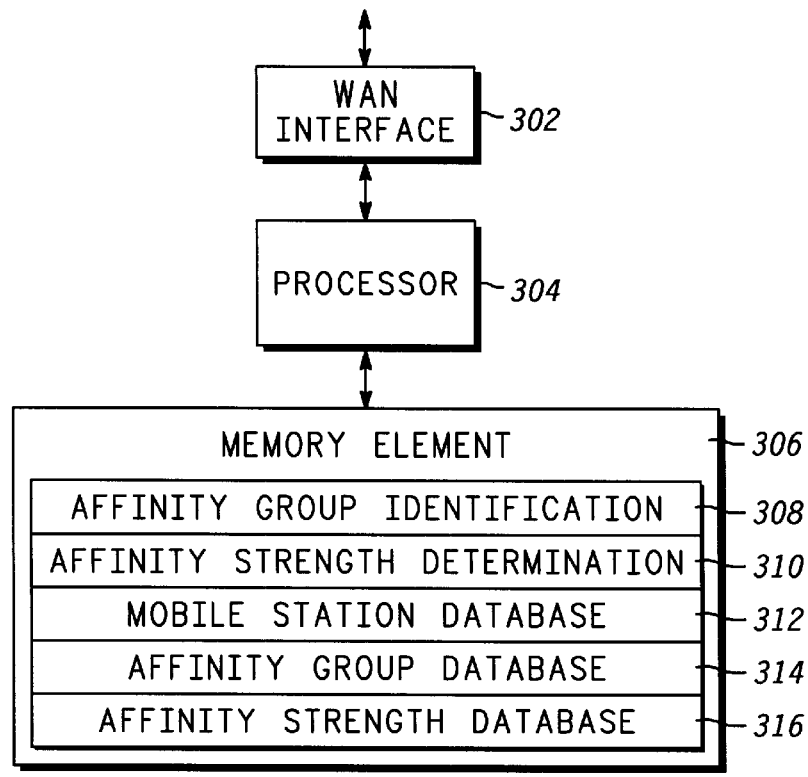
FIG. 3 is an electrical block diagram of an exemplary network database processor in accordance with the present invention.

Referring to FIG. 3, an electrical block diagram depicts an exemplary network database controller 116 in accordance with the present invention, comprising a conventional WAN interface 302 for communicating with the communication resources 102 and for communicating with other systems 100 through the WAN 118. The network database controller 116 further comprises a conventional processor 304 coupled to the WAN interface 302 for processing communications sent to and from the WAN interface 302. A conventional memory element 306 is coupled to the processor 304 for storing software and operating parameters in accordance with the present invention. In one embodiment, the memory element 306 comprises an affinity group identification program 308 for programming the processor 304 to identify affinity groups to which the mobile stations 114 served by the network database controller 116 belong. In addition, in this embodiment, the memory element 306 includes an affinity strength determination element 310 for programming the processor 304 to determine and store historical affinity strengths between the mobile stations 114 and the affinity groups. The memory element 306 further comprises space for storing a mobile station database 312 including operating parameters for the mobile stations 114 served by the network database controller 116. In addition, in some embodiments, the memory element 306 includes space for storing an affinity group database 314 and an affinity strength database relevant to the mobile stations 114 served by the network database controller 116. Operation of the network database controller 116 in accordance with the present invention is described further below.

Figure 4:
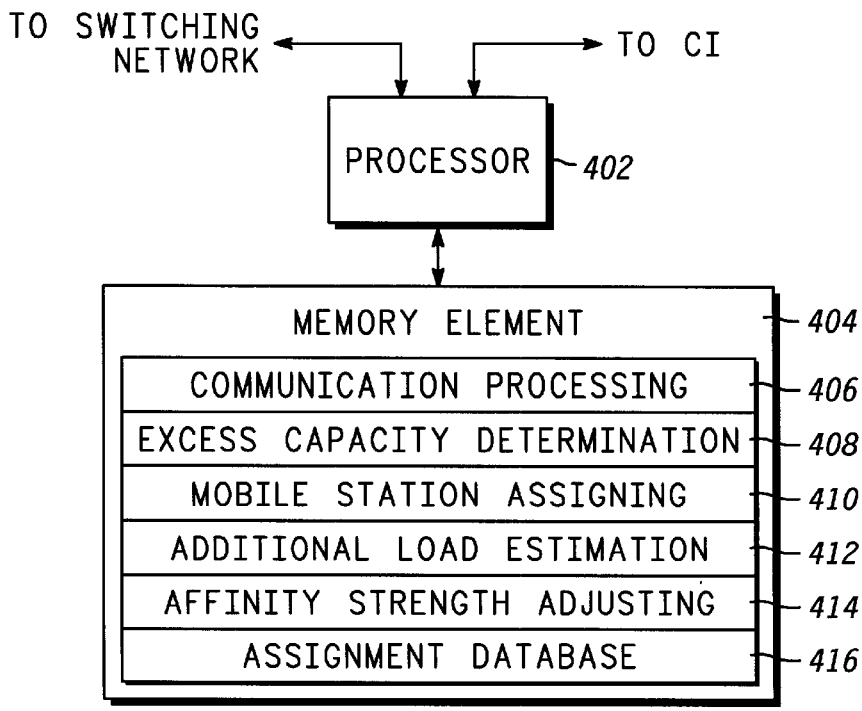
FIG. 4 is an electrical block diagram of an exemplary communication resource in accordance with the present invention.

Referring to FIG. 4, an electrical block diagram depicts an exemplary communication resource 102 in accordance with the present invention, comprising a processor 402 for controlling the communication resource 102, and a memory element 404 coupled to the processor 402 for storing software and operating parameters in accordance with the present invention. The memory element 404 comprises a communication processing program 406 for programming the processor 402 to communicate with the network database controller 116 as well as with the mobile station 114 through the base stations 112. The memory element 404 further comprises an excess capacity determination program 408 for programming the processor 402 to determine the excess capacity remaining in the communication resource 102. In addition, the memory element 404 includes a mobile station assigning program 410 for programming the processor 402 to cooperate with other communication resources 102 and with the mobile station 114 to assign the mobile station 114 to the communication resource 102 having the highest total affinity strength with the mobile station 114. It will be appreciated that, in some embodiments, the assigning program 410 can also program the processor 402 to cooperate with the network database controller 116, as well, to assign the mobile station 114 to the communication resource 102 having the highest total affinity strength with the mobile station 114.

The memory element 404 further comprises an additional load estimation program 412 for programming the processor to estimate the additional load that would be imposed upon the communication resource 102 should the mobile station 114 be assigned to the communication resource 102. The memory element 404 also includes an affinity strength adjusting program 414 for adjusting the total affinity strength calculated for the communication resource 102, when the expected additional load is larger than the excess capacity of the communication resource 102. In addition, the memory element 404 preferably includes space for storing an assignment database 416 for identifying mobile stations 114 and affinity groups which are assigned to the communication resource 102.

Referring to FIG. 5, a flow diagram 500 depicting operation of the wireless communication system 100 in accordance with the present invention begins with a mobile station 114 requesting 502 assignment to a communication resource 102. Then, an entity of the system 100 identifies 504 affinity groups to which the mobile station belongs. In one embodiment, the entity that identifies the affinity groups is the mobile station 114. In another embodiment, the entity that identifies the affinity groups is the network database controller 116 associated with the mobile station 114. Next, the historical affinity strengths between the mobile station 114 and the affinity groups to which the mobile station 114 belongs are determined 506. As before, in one embodiment, the affinity strengths are determined by the mobile station 114 from information stored in its affinity strength database 222. For example, in this embodiment, the affinity strength between a mobile station 114 and one of its affinity groups can be calculated as follows. The affinity strength is derived from the average number of calls or messages and the average duration or size of each call or message. Past measurements of calling statistics between the mobile station 114 and all other members of the group (or a representative sample) are averaged for the mobile station 114, and stored for each of its affinity groups. It will be appreciated that, alternatively, affinity strength can also be derived from size of the affinity group, or from attributes added to group records by the service provider or end user, e.g., groups marked as urgent.

In another embodiment, the affinity strengths are determined 506 by the network database controller 116 which serves the mobile station 114, from calling statistics corresponding to the mobile station 114 in the affinity strength database 316. In this other embodiment the network database controller 116 preferably estimates the historical affinity strengths from past calling statistics of the members of each affinity group. For example, in this embodiment, the network database controller 116 preferably estimates the affinity strength of a group to be a measure of the average amount of communication that takes place between two of its members. The affinity strength estimate is adjusted for any one-to-many or many-to-many group calls or messages that take place within the affinity group. Past measurements of calls or messages between all members of the group (or a representative sample) are averaged over the whole group, and stored in the system 100.

Next, the system 100 calculates 508, for each of the communication resources 102 serving members of the affinity groups to which the mobile station 114 belongs, a total affinity strength between the mobile station 114 and the other members served by the communication resource 102. This can be accomplished, for example, by summing over all members of the affinity groups assigned to the communication resource 102 using the individual affinities between the members and the mobile station 114. Alternatively, one can sum over all affinity groups assigned to the communication resource 102 the average affinity of each group with the mobile station 114. In addition, the system 100 preferably calculates the excess capacity of each communication resource 102 from estimated average future loads of affinity groups assigned to the communication resource 102. More specifically, the system 100 preferably subtracts the estimated average future loads of affinity groups assigned to the communication resource 102 from the predetermined maximum load capacity of the communication resource 102, to obtain the excess capacity of the communication resource 102.

The system then checks 510 whether the mobile station 114 is a first member of an affinity group to be assigned to a communication resource 102 of the system 100, i.e., whether the mobile subscriber belongs to an affinity group that is not currently active in the system 100. If not, then the system 100 assigns 522 the mobile station 114 to the communication resource 102 having the highest total affinity strength with the mobile station 114.

If, on the other hand, the mobile station 114 is the first member of an affinity group to be assigned to a communication resource 102 of the system 100, then the system 100 estimates 512, from historical data stored for the affinity groups of the first member, an expected additional load on one of the plurality of communication resources 102 that would result from assigning the first member to the one of the plurality of communication resources 102. Next, the system 100 compares 514 the expected additional load with an excess capacity of the one of the communication resources 102. The system 100 then checks 516 whether the expected additional load is greater than the excess capacity. If so, the system adjusts 518 the total affinity strength calculated for the one of the communication resources 102, in response. Preferably, the system 100 adjusts the total affinity strength in a manner such that the total affinity strength between the mobile station 114 and the other members served by the one of the communication resources 102 is reduced by the adjustment. For example, one could multiply the total affinity strength by a predetermined fraction. The intent here is to reduce the probability of assigning the mobile station 114 to the one of the communication resources 102, because the affinity group associated with the mobile station 114 is likely to exceed the capacity of the communication resource 102. It will be appreciated that, when the total affinity strength for the one of the communication resources is zero, no adjustment is necessary. The system 100 then checks 520 whether all the communication resources 102 have been processed through step 512. If not, the flow returns to step 512 to process the next one of the communication resources. If, on the other hand, all the communication resources 102 have been processed through step 512, then the flow moves to step 522 to assign the mobile station 114 to the communication resource 102 having the highest total affinity strength with the mobile station 114, following the adjustment process.

It should be clear from the preceding disclosure that the present invention provides a method and apparatus for assigning a mobile station to a communication resource selected from a plurality of communication resources. The method and apparatus advantageously takes into account the excess capacity of the communication resource and the potential load that can result from the assignment, and selects the communication resource based upon a total affinity strength between the mobile station and the communication resource, thereby maximizing the efficiency of group calls in the system.

Many modifications and variations of the present invention are possible in light of the above teachings. For example, the embodiments described herein above have assigned specific functions to be performed by specific devices in the system. It will be appreciated that, because the devices in the system can communicate with the other devices in the system, the specific functions can be moved to devices other than the specific devices described in the above embodiments. In addition, the communication resources can be alternative radio resources, or even separate wireless networks. Thus, it is to be understood that, within the scope of the appended claims, the invention can be practiced other than as specifically described herein above.

What is claimed is:

1. A method of assigning a mobile station to a communication resource of a plurality of communication resources, comprising the steps of:

identifying affinity groups to which the mobile station belongs;

determining historical affinity strengths between the mobile station and the affinity groups;

calculating, for each of the plurality of communication resources serving members of the affinity groups, a total affinity strength between the mobile station and the members served by the communication resource;

assigning the mobile station to the communication resource having a highest total affinity strength with the mobile station;

when a first member of an affinity group is being considered for assignment to one of the plurality of communication resources, estimating, from historical data stored for the affinity groups of the first member, an expected additional load on the one of the plurality of communication resources that would result from assigning the first member to the one of the plurality of communication resources;

comparing the expected additional load with an excess capacity of the one of the plurality of communication resources; and adjusting the total affinity strength calculated for the one of the plurality of communication resources, in response to the expected additional load being larger than the excess capacity.

2. The method of claim 1, wherein the determining step comprises the step of estimating the historical affinity strengths from past calling statistics of the members of each affinity group.

3. The method of claim 1, wherein the determining step comprises the step of estimating the historical affinity strengths from past calling statistics between the mobile station and other members of each affinity group.

4. The method of claim 1, wherein the calculating step includes the step of adjusting the total affinity strength by a factor derived from an excess capacity of the communication resource.

5. The method of claim 4, further comprising the step of calculating the excess capacity of the communication resource from estimated average future loads of affinity groups assigned to the communication resource.

6. The method of claim 1, further comprising the step of calculating the excess capacity from estimated average future loads of affinity groups assigned to the one of the plurality of communication resources.

7. A wireless communication system for assigning a mobile station to a communication resource of a plurality of communication resources, the wireless communication system comprising:

the plurality of communication resources;

a network database coupled to the plurality of resources; and the mobile station, wherein the plurality of communication resources, the network database, and the mobile station are arranged to cooperate with one another to:

identify affinity groups to which the mobile station belongs;

determine historical affinity strengths between the mobile station and the affinity groups;

calculate, for each of the plurality of communication resources serving members of the affinity groups, a total affinity strength between the mobile station and the members served by the communication resource;

assign the mobile station to the communication resource having a highest total affinity strength with the mobile station, wherein the plurality of communication resources, the network database, and the mobile station are further arranged, when a first member of an affinity group is being considered for assignment to one of the plurality of communication resources, to:

estimate, from historical data stored for the affinity groups of the first member, an expected additional load on the one of the plurality of communication resources that would result from assigning the first member to the one of the plurality of communication resources;

compare the expected additional load with an excess capacity of the one of the plurality of communication resources; and adjust the total affinity strength calculated for the one of the plurality of communication resources, in response to the expected additional load being larger than the excess capacity.

8. The wireless communication system of claim 7, wherein the plurality of communication resources, the network database, and the mobile station are further arranged to cooperate with one another to estimate the historical affinity strengths from past calling statistics of the members of each affinity group.

9. The wireless communication system of claim 7, wherein the plurality of communication resources, the network database, and the mobile station are further arranged to cooperate with one another to estimate the historical affinity strengths from past calling statistics between the mobile station and other members of each affinity group.

10. The wireless communication system of claim 7, wherein the plurality of communication resources, the network database, and the mobile station are further arranged to cooperate with one another to adjust the total affinity strength by a factor derived from an excess capacity of the communication resource.

11. The wireless communication system of claim 10, wherein the plurality of communication resources, the network database, and the mobile station are further arranged to calculate the excess capacity of the communication resource from estimated average future loads of affinity groups assigned to the communication resource.

12. The wireless communication system of claim 7, wherein the plurality of communication resources, the network database, and the mobile station are further arranged to calculate the excess capacity from estimated average future loads of affinity groups assigned to the one of the plurality of communication resources.

13. A mobile station for cooperating with a wireless communication system to assign the mobile station to a communication resource of a plurality of communication resources, the mobile station comprising:

a transmitter for sending information to a fixed portion of the wireless communication system;

a processor coupled to the transmitter for controlling the transmitter;

a receiver coupled to the processor for receiving messages from the fixed portion of the wireless communication system; and a memory element coupled to the processor for storing software and historical data about the mobile station, wherein the processor is programmed to:

identify affinity groups to which the mobile station belongs;

determine and store historical affinity strengths between the mobile station arid the affinity groups;

report selected ones of the historical affinity strengths to the fixed portion of the wireless communication system when requesting an assignment to the communication resource; and process an assignment of the mobile station to the communication resource, wherein the communication resource has a highest total affinity strength with the mobile station of any of a plurality of other communication resources, wherein the total affinity strength calculated for the communication resource was adjusted in response to an expected additional load being larger than an excess capacity, wherein the expected additional load is estimated using the historical affinity strengths reported to the fixed portion of the wireless communication system.

14. The mobile station of claim 13, wherein the processor is further programmed to estimate the historical affinity strengths from past calling statistics between the mobile station and other members of each affinity group.

* * * * *

UNITED STATES PATENT AND TRADEMARK OFFICE
CERTIFICATE OF CORRECTION

| | |
|---|---|
| PATENT NO. | : 6,314,301 B1 |
| DATED | : November 6, 2001 |
| INVENTOR(S) | : Dorenbosch et al. |

Page 1 of 1

It is certified that error appears in the above-identified patent and that said Letters Patent is hereby corrected as shown below:

<u>Column 8,</u>
Line 24, reads "arid", should be -- and --

Signed and Sealed this

Twenty-first Day of May, 2002

Attest:

*Attesting Officer*

JAMES E. ROGAN
*Director of the United States Patent and Trademark Office*